Nov. 9, 1937.  W. GÜNTHER  2,098,917
OPTICAL INSTRUMENT
Filed Sept. 21, 1936  2 Sheets-Sheet 2

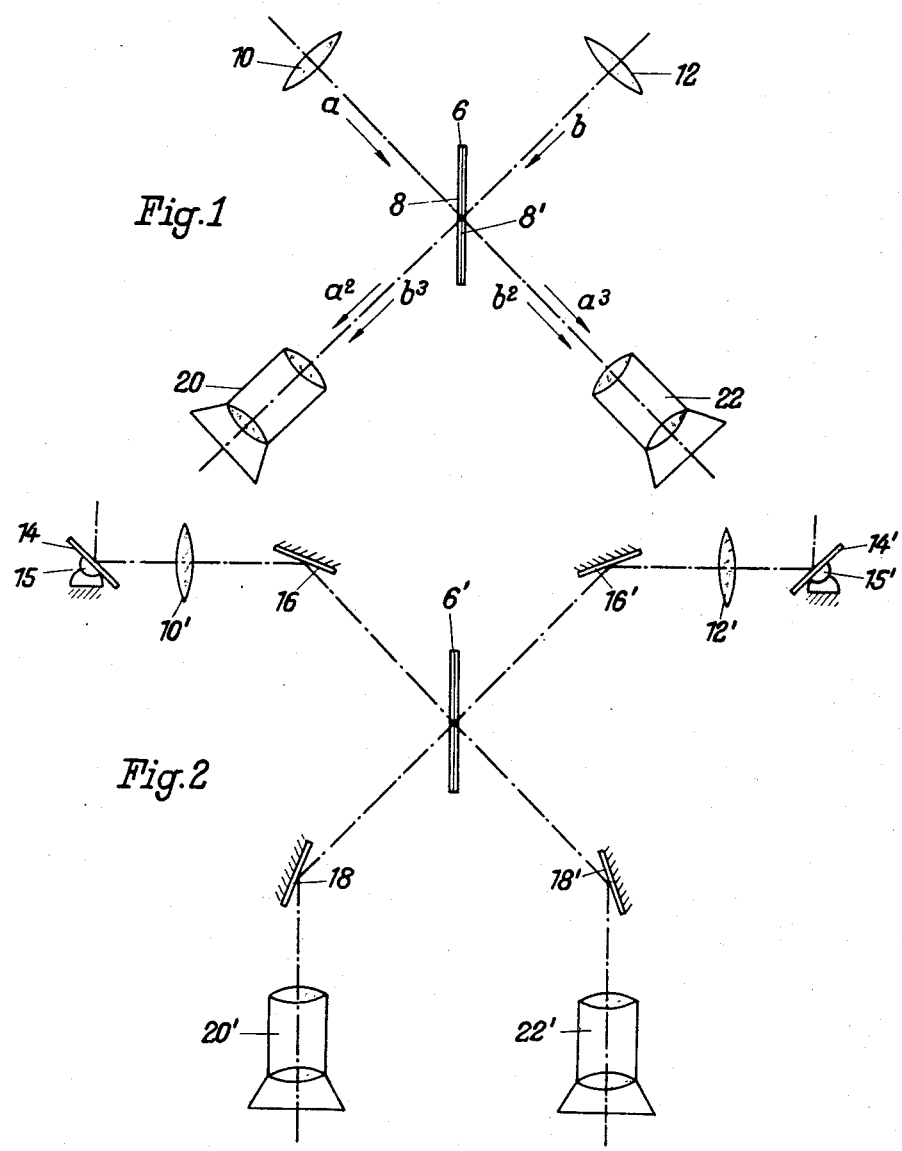

Inventor.
Wolfgang Günther
By Karl Viertel
Attorney

Patented Nov. 9, 1937

2,098,917

UNITED STATES PATENT OFFICE 2,098,917

OPTICAL INSTRUMENT

Wolfgang Günther, Berlin-Friedenau, Germany, assignor to Askania-Werke A. G., vormals Centralwerkstatt-Dessau und Carl Bamberg-Friedenau, a corporation of Germany Application September 21, 1936, Serial No. 101,826
In Germany September 20, 1935

3 Claims. (Cl. 88—1)

My invention relates to improvements in telescopes, theodolites and like optical instruments of the type involving the production of composite images, namely having two sighting devices, which are adapted to be directed to two different objects or view fields and to produce a composite or compound image consisting of the two images of the view fields of reference superposed upon each other. Optical instruments of said description were designed and have come into use in recent years for surveying and measuring purposes of various kinds including determining distances, angular magnitudes and solving hydrographic, photometric, aeronautic and other problems; for reasons known to experts in this field said instruments have one single eye piece.

The invention aims at providing a binocular instrument for the purposes concerned, so designed that identical composite images are produced therein, which show the objects under observation entirely and in superposed position to each other, and which can be viewed at ease by the observer with both his eyes.

Another object of the invention is to provide a structurally modified optical instrument of the type concerned and of relatively simple construction, which can be used at ease by two persons for jointly and simultaneously making identical observations.

An important feature of the optical instruments re-designed according to this invention consists therein, that the optical paths of travel of the light rays passing from the objectives to the respective eye pieces are of equal length.

The nature and scope of the invention are briefly outlined in the appended claims and will be more fully understood from the following specification taken together with the accompanying drawings, in which a few embodiments of the invention are shown by way of examples:

Fig. 1 is a layout diagrammatically showing the simplest form of an optical instrument designed according to this invention;

Fig. 2 diagrammatically shows a structurally modified optical instrument of binocular design namely to be used by a single person;

In its simplest form, diagrammatically shown in Fig. 1 of the drawings, the improved optical instrument comprises:

(1) a flat screen 6 of special design known in the optical field and presenting an extremely thin layer of metal or other light reflecting material, so finely dispersed, uniformly spread out and evenly distributed on a holder of translucent material 8, 8', that only about one half of the light rays thrown on the screen are actually reflected, while the other half will freely pass therethrough, as indicated by arrows $a$—$a2$—$a3$, $b$—$b2$—$b3$;

(2) a pair of objectives of equal focal length, indicated at 10, 12 and being symmetrically arranged relatively to said screen 6 for cooperation therewith in such manner, that the light rays issuing from said objectives intersect at said screen under equal angles of inclination, and (3) two eye pieces indicated at 20, 22 and being symmetrically arranged relatively to said screen for cooperation therewith and with said objectives in such manner, that the optical paths of travel of the two bundles of light rays passing from the objectives to the eye pieces are of equal length.

Through said eye pieces 20, 22 identical composite images will be seen, each of which consisting of two super-imposed pictures as identified by arrows $a2$—$b3$ and $a3$—$b2$.

In Fig. 2 a structurally modified optical instrument of binocular design according to this invention is shown, in which the eye pieces 20', 22' are arranged with their axes parallel to each other; the objects 10', 12', screen 6' and eye pieces 20', 22' are cooperatively associated with mirrors, prisms or other accessorial light deflecting means 14—14', 16—16', 18—18' of which 14—14' are preferably provided with hinges or universal joints, indicated at 15—15', so as to be capable of being tilted and adjusted.

Various other changes and modifications may be conveniently made in the structural details and accessorial elements.

Figure 3:
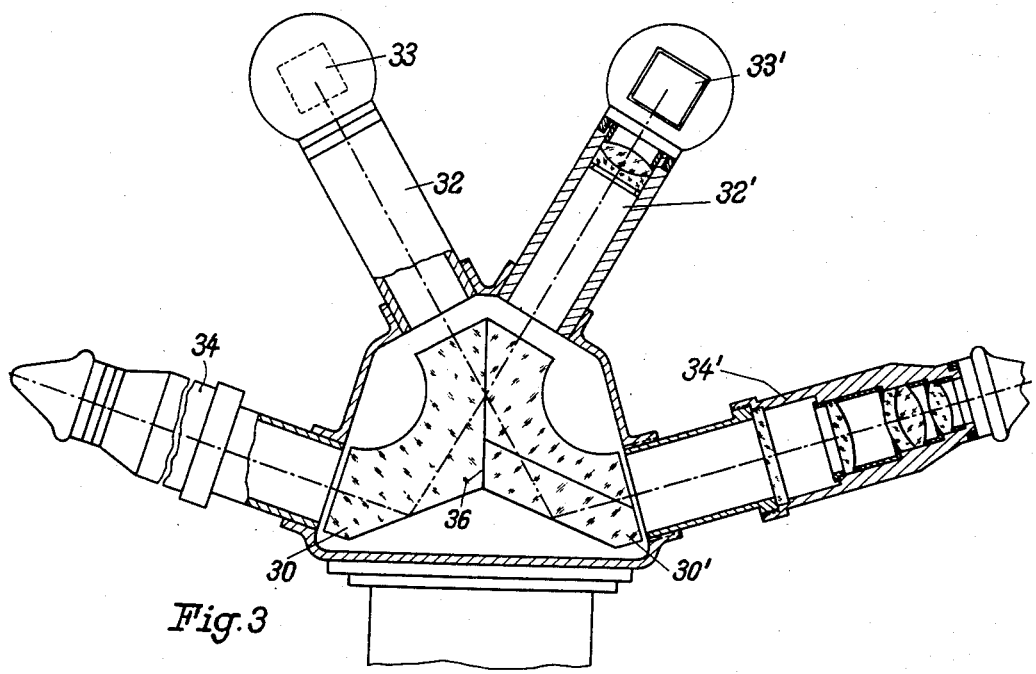
Fig. 3 is an elevation, partly in section, showing another structurally modified instrument to be used by two observers simultaneously.

For instance the light deflecting means inter-associating the objectives, screen and eye pieces may be structurally combined to advantage so as to form one unit as seen in Fig. 3, wherein said deflecting means comprise a pair of prisms 30, 30' arranged in the center of the instrument symmetrically to the objectives 32, 32' and the eye pieces 34, 34', said prisms engaging each other at their opposed faces and enclosing the screen 36 therebetween.

Figure 4:
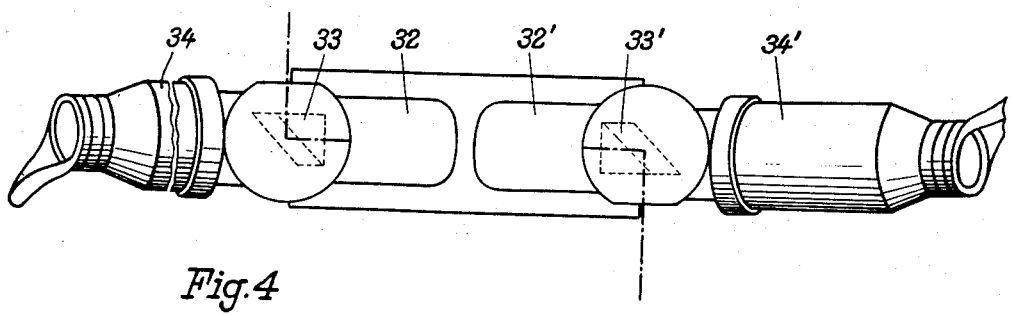
Fig. 4 is a plan appertaining to Fig. 3.

In Figs. 3 and 4 33, 33' designate light deflecting means in the form of prisms attached to the objectives 32, 32' and being adapted to be turned around into different positions relatively to said objectives 32, 32' and the view fields to be aimed at.

What I claim is:

1. In an optical instrument of the type set forth the combination with a flat screen adapted to reflect about one half of the light rays thrown thereupon and allowing the other half to pass therethrough, of two objectives of equal focal length symmetrically arranged relatively to said screen for cooperation therewith in such manner, that the bundles of light rays issuing from said objectives intersect at said screen under equal angles thereto, and two eye pieces symmetrically arranged relatively to said screen for cooperation therewith and with said objectives, in such manner, that the optical paths of travel of the two bundles of light rays passing from the objectives to the eye pieces are of equal length.

2. In an optical instrument of the type set forth the combination with a flat screen adapted to reflect about one half of the light rays thrown thereupon and allowing the other half to pass therethrough, of two objectives of equal focal length symmetrically arranged relatively to said screen for cooperation therewith, in such manner, that the bundles of light rays issuing from said objectives intersect at said screen under equal angles thereto, two eye pieces symmetrically arranged relatively to said screen for cooperation therewith and with said objectives in such manner, that the optical paths of travel of the two bundles of light rays passing from the objectives of the eye pieces are of equal length,—and light deflecting means for cooperation with said objectives, screen and eye pieces.

3. In an optical instrument of the type set forth the combination with a flat screen adapted to reflect about one half of the light rays thrown thereupon and allowing the other half to pass therethrough, of two objectives of equal focal length symmetrically arranged relatively to said screen for cooperation therewith, in such manner, that the bundles of light rays issuing from said objectives intersect at said screen under equal angles thereto, two eye pieces symmetrically arranged relatively to said screen for cooperation therewith and with said objectives in such manner, that the optical paths of travel of the two bundles of light rays passing from the objectives of the eye pieces are of equal length, and light deflecting means for cooperation with said objectives, screen and eye pieces,—said light deflecting means comprising a pair of prisms symmetrically arranged relatively to said objectives and eye pieces and interengaging each other at their opposed faces so as to form one unit, said screen being enclosed between the opposed faces of said prisms.

WOLFGANG GÜNTHER.